US007962957B2

(12) United States Patent
Keohane et al.

(10) Patent No.: US 7,962,957 B2
(45) Date of Patent: Jun. 14, 2011

(54) METHOD AND APPARATUS FOR DETECTING PORT SCANS WITH FAKE SOURCE ADDRESS

(75) Inventors: Susann Marie Keohane, Austin, TX (US); Gerald Francis McBrearty, Austin, TX (US); Shawn Patrick Mullen, Buda, TX (US); Jessica Carol Murillo, Round Rock, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 900 days.

(21) Appl. No.: 11/738,547

(22) Filed: Apr. 23, 2007

(65) Prior Publication Data
US 2008/0263666 A1 Oct. 23, 2008

(51) Int. Cl.
*G06F 21/00* (2006.01)
(52) U.S. Cl. .............................. 726/23; 726/13; 726/22
(58) Field of Classification Search ....................... 726/23
See application file for complete search history.

(56) References Cited

U.S. PATENT DOCUMENTS

| | | | |
|---|---|---|---|
| 7,551,620 B1 * | 6/2009 | Samuels et al. | 370/394 |
| 7,664,855 B1 * | 2/2010 | Freed et al. | 709/225 |
| 2003/0110274 A1 | 6/2003 | Pazi et al. | |
| 2004/0162994 A1 * | 8/2004 | Cohen et al. | 713/201 |
| 2005/0018618 A1 | 1/2005 | Mualem et al. | |

OTHER PUBLICATIONS

Dethy, Examining port scan methods—Analysing Audible Techniques, 2001, http://www.in-f-or.it/informatica/docs/portscan.pdf conslulted Apr. 20, 2010.*
Templeton, Detecting Spoof Packets, 2003, IEEE, Proceedings of the DARPA Information Survivability Conference and Exposition (DISCEX'03).*
"Examining Port Scan Methods—Analysing Audible Techniques", pp. 1-18, retrieved Feb. 13, 2007. www.totse.com/en/hack/hacking/lans/wans/networks/outdials/162024.html.
Suzuki, IT/Network Integrated Solution "UNIVERGE", 2004 NEC Technical Journal, vol. 57, No. 5, pp. 112-115.
Japan Patent office office action May 2010.

* cited by examiner

*Primary Examiner* — Vivek Srivastava
*Assistant Examiner* — Thomas Lauzon
(74) *Attorney, Agent, or Firm* — Yee & Associates, P.C.; Justin M. Dillon

(57) ABSTRACT

A computer implemented method, apparatus, and computer program product for port scan protection. A reply data packet having a modified transmission control protocol header is generated to form a modified reply data packet, in response to detecting a port scan. The modified reply data packet will elicit a response from a recipient of the modified data packet. The reply data packet is sent to a first Internet protocol address associated with the port scan. A second Internet protocol address is identified from a header of the response to the modified reply data packet. The second Internet protocol address is an actual Internet protocol address of a source of the port scan. All network traffic from the second Internet protocol address may be blocked to prevent an attack on any open ports from the source of the port scan.

35 Claims, 6 Drawing Sheets

300

| LAYER | EXAMPLE |
|---|---|
|  |  |
| 302 APPLICATION |  |
| 304 PRESENTATION |  |
| 306 SESSION |  |
| 308 TRANSPORT LAYER | TCP OR UDP |
| 310 NETWORK | IPv4 OR IPv6 |
| 312 DATALINK LAYER | ETHERNET NETWORK INTERFACE CARD |
| 314 PHYSICAL LAYER | THE CABLE |

400

```
       ⎧ ⎧Port scan packet sent out from Malicious Hacker host B
   704 ⎨ ⎨ ETH: ====(62 Bytes received on interface en2)==== 22:27:09:525571519
       ⎩ ⎩ ETH: [00:05:32:e8:8b:81->00:02:55:76:1a:5b] type 800 (IP)
   705 ── IP:  <SRC = 9.50.19.13> (Incidental Victim A)
   706 ── IP:  <DST = 9.3.126.115> (Victim C)
          IP:  ip_v=4, ip_h1=20, ip_tos=104, ip_len=48, ip_id=20662, ip_off=0 DF    ⎫ 702
          IP:  ip_tt1=115, ip_sum=12f5, ip_p=6(TCP)
   708 ── TCP: <scource port=1494(ica), destination port=23(telnet)>
   710 ── TCP: th_seq=2155854634, th_ack=0
   712 ── TCP: th_off=7, flags<SYN>

Reply from
          ETH: ====(60 Bytes transmitted on interface en2)==== 22:27:09:525730836
          ETH: [00:02:55:76:1a:5b->00:05:32:e8:8b:81] type 800 (IP)
   714 ── IP:  <SRC = 9.3.126.115> (Victim C)
   716 ── IP:  <DST = 9.50.19.13> (Incidental Victim A)
          IP:  ip_v=4, ip_h1=20, ip_tos=0, ip_len=44, ip_id=15395, ip_off=0 DF
          IP:  ip_tt1=60, ip_sum=5cf4, ip_p=6(TCP)                                  ⎫ 703
          TCP: <scource port=23(telnet), destination port=1494(ica)>
          TCP: th_seq=2595242373, th_ack=2155854635
   722 ── TCP: th_off=6, flags<SYN I ACK> replace with <RST> or <FIN>
          TCP: th_win=58520, th_sum=f1fe, th_urp=0
          TCP:     mss 1460
```

*FIG. 7*

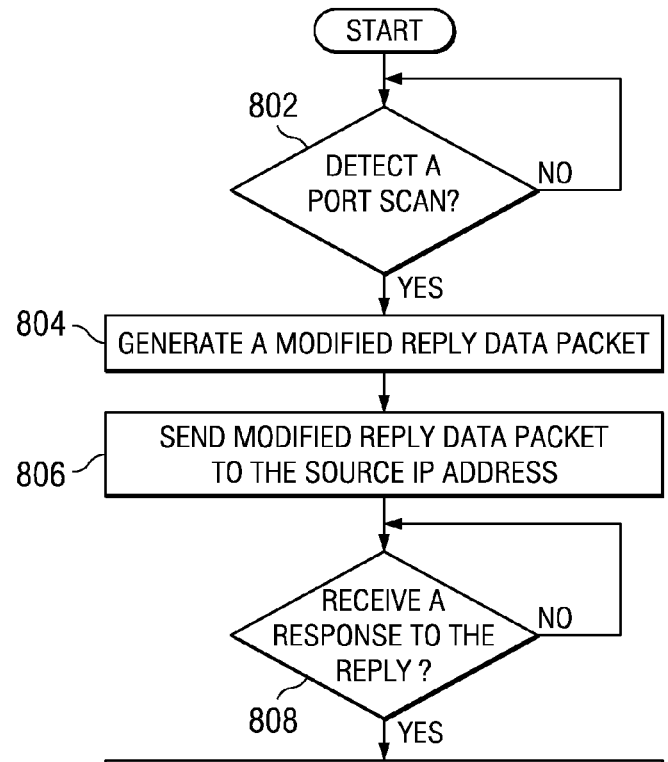
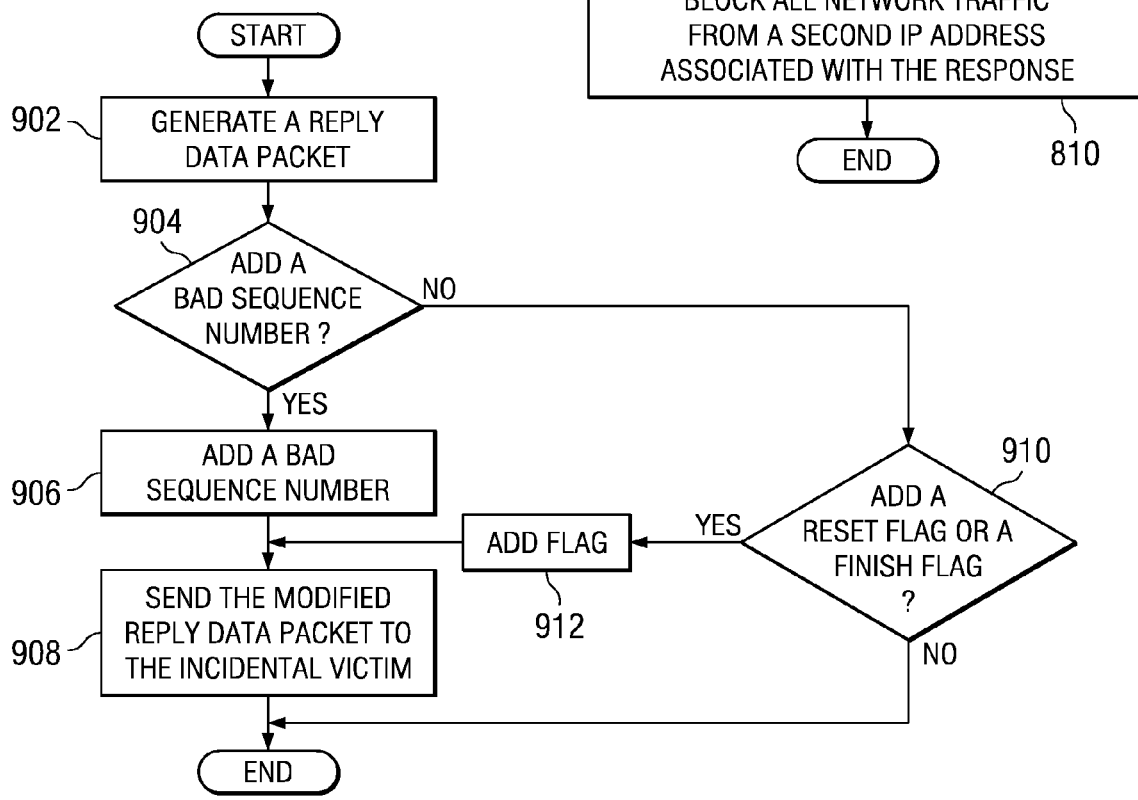

METHOD AND APPARATUS FOR DETECTING PORT SCANS WITH FAKE SOURCE ADDRESS

BACKGROUND OF THE INVENTION

1. Field of the Invention

The present invention is related generally to a data processing system and in particular to a method and apparatus for data processing system security. More particularly, the present invention is directed to a computer implemented method, apparatus, and computer usable program code for blocking a port scanner using fake source Internet protocol addresses.

2. Description of the Related Art

A user on a computing device, such as a client, connected to a network can execute an application or other service available on a different computing device, such as a server, by connecting to a port on the server associated with the application or service. A port is an endpoint to a logical connection between a client and a server in a network. Ports are typically identified by a port number. Each application available on the server is associated with a different port number.

In other words, a port is like a door or gateway to a particular application on a computer. Like a door, a port may be open or closed. An open port on a server is a port associated with an application that is currently available on the server for use by one or more client computers. A closed port is a port that is not associated with an application or service that is available on the server. A hacker typically cannot access a computer through a closed port.

A computing device can access a particular application on a server by specifying the port number associated with the particular application. However, sometimes unauthorized or malicious users may want to access an application or service on the server for purposes of launching an attack on the server. These users are typically referred to as hackers or computer crackers. The server that is attacked by a hacker may be referred to as an intended victim.

Hackers generally do not know what applications or services are available on the intended victim. Therefore, the hacker may perform a port scan. A port scan is a method for systematically scanning a computer's ports to determine which ports are open ports associated with an available application or service and which ports are closed ports. In port scanning, a series of messages are sent requesting a connection with each well-known port. The response received from the intended victim indicates whether the well-known port is an open port or a closed port. Port scanning is used by hackers to locate open access points to a computer which may be vulnerable to an attack.

Once a vulnerable open port is located, a hacker can launch an attack that may cause the resources of the application associated with the attacked open port unavailable to intended users of the application. This type of attack is sometimes referred to as a denial-of-service (DOS) attack.

One solution to this problem is provided by port scan protection software. Current port scan protection software identifies the source Internet protocol (IP) address in a connection request that may be part of a port scan. The port scan protection software then blocks that source IP address. In other words, the port scan software does not allow any additional messages from that source IP address to be received. This can prevent subsequent attacks by a hacker using the same source IP address.

However, hackers have circumvented current port scan prevention software by using fake source IP addresses during port scans to locate open ports. When the port scan software recognizes that a port scan may be taking place, the port scan prevention software blocks the fake IP address identified in the port scan messages. However, the current port scan prevention software does not block the hacker's actual IP address. Thus, the hacker remains free to launch attacks on any open ports using the hacker's actual IP address, which is not blocked by the port scan protection software. These attacks may lead to denial-of-service (DOS) effects on users attempting to gain legitimate access to applications and/or services provided by the intended victim. In addition, these attacks can lead to loss of time, data, and revenue while the applications and/or services are unavailable.

SUMMARY OF THE INVENTION

The illustrative embodiments provide a computer implemented method, apparatus, and computer usable program code for port scan protection. In one embodiment, the process generates a reply data packet having a modified header for a protocol used to transmit data packets to form a modified reply data packet in response to detecting a port scan. In one embodiment, the modified header for a protocol used to transmit data packets is a modified transmission control protocol header.

The modified reply data packet will elicit a response from a recipient of the modified data packet. The process sends the reply data packet to a first routing address associated with the port scan.

The process identifies a second routing address in a header of the response data packet in response to receiving a response to the modified reply data packet. The second routing address is an actual routing address of a source of the port scan. All network traffic from the second routing address may then be blocked to prevent an attack on any open ports. In one embodiment, the first routing address is a first Internet protocol address and the second routing address is a second Internet protocol address.

The modified header for the protocol used to transmit data packets may include a bad sequence number. A bad sequence number is a sequence number falling outside an acceptable range of sequence numbers or a protocol that elicits a response from the recipient of the reply data packet. In another embodiment, the modified header may include a reset flag or a finish flag. In another embodiment, the modified header is generated by altering a checksum used to generate the modified reply data packet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 is an exemplary illustration of port scan packets transmitted during a port scan in accordance with an illustrative embodiment;

FIG. 8 is a flowchart illustrating a process for detecting a port scan with a fake source IP address in accordance with an illustrative embodiment; and FIG. 9 is a flowchart illustrating a process for modifying a reply data packet in accordance with an illustrative embodiment.

DETAILED DESCRIPTION OF THE PREFERRED EMBODIMENT

Figure 1:
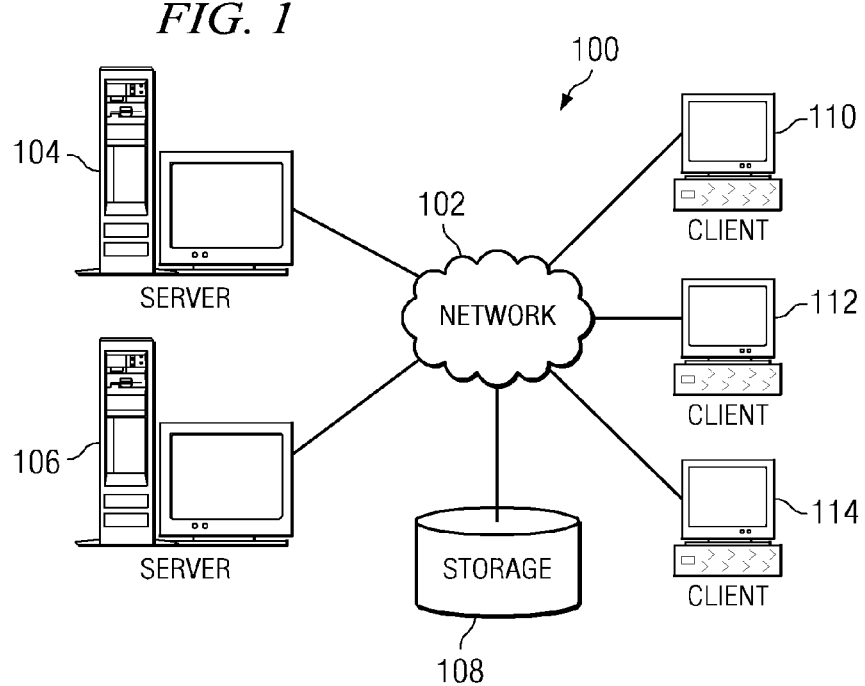
FIG. 1 is a pictorial representation of a network of data processing systems in which illustrative embodiments may be implemented.
Figure 2:
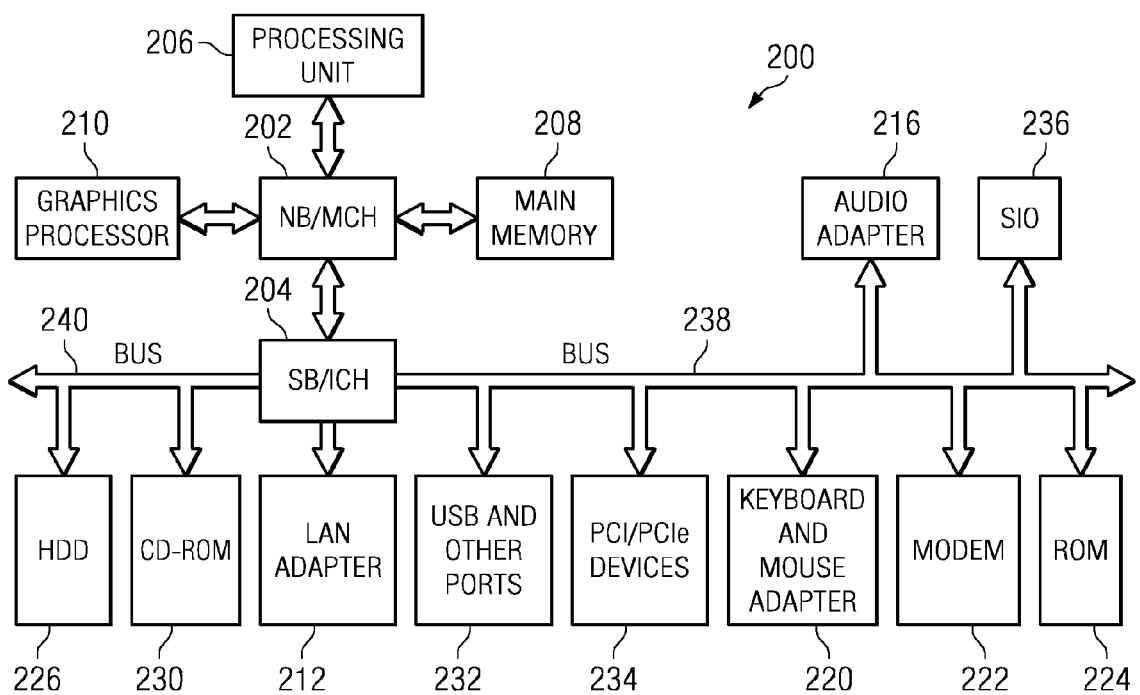
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

A computing device, such as client 110, can execute an application or other service available on a different computing device, such as server 106, available over network 102 by connecting to a port on server 106 associated with the desired application or service. An application is computer software that uses the resources of a computing device to perform a task or service for a user.

A port is an endpoint to a logical connection between client 110 and server 106 in network 102. Ports are typically identified by a port number. Port numbers range from 0 to 65,536. Port numbers are assigned by the Internet Assigned Numbers Authority (IANA). The Internet Assigned Numbers Authority is operated by Internet Corporation for Assigned Names and Numbers (ICANN).

Each application available on server 104 or 106 is associated with a different port number. Some port numbers are pre-assigned based on the type of application or service that is associated with a given port. These pre-assigned or standard port numbers are referred to as well-known ports. There are approximately 1,024 well-known port numbers reserved or pre-assigned to particular services and applications. For example, well-known port numbers include, but are not limited to, port 80 for hypertext transfer protocol (HTTP) traffic, port 23 for Telnet, port 25 for simple mail transfer protocol (SMTP), port 53 for domain name servers (DNS), and port 194 for Internet relay chat (IRC). Thus, any port on any server that is designated for hypertext transfer protocol traffic will typically have an assigned port number of 80.

Client 110 can access a particular application on server 104 or 106 by sending a connection request that specifies the port number associated with the particular application.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 106 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

Transmission control protocol/Internet protocol (TCP/IP) is a suite of communications protocols used to connect computing devices over a network, such as network 102 in FIG. 1. Transmission control protocol and Internet protocol are the standard protocols for transmitting data over networks, such as the Internet.

Figures 3, 4:
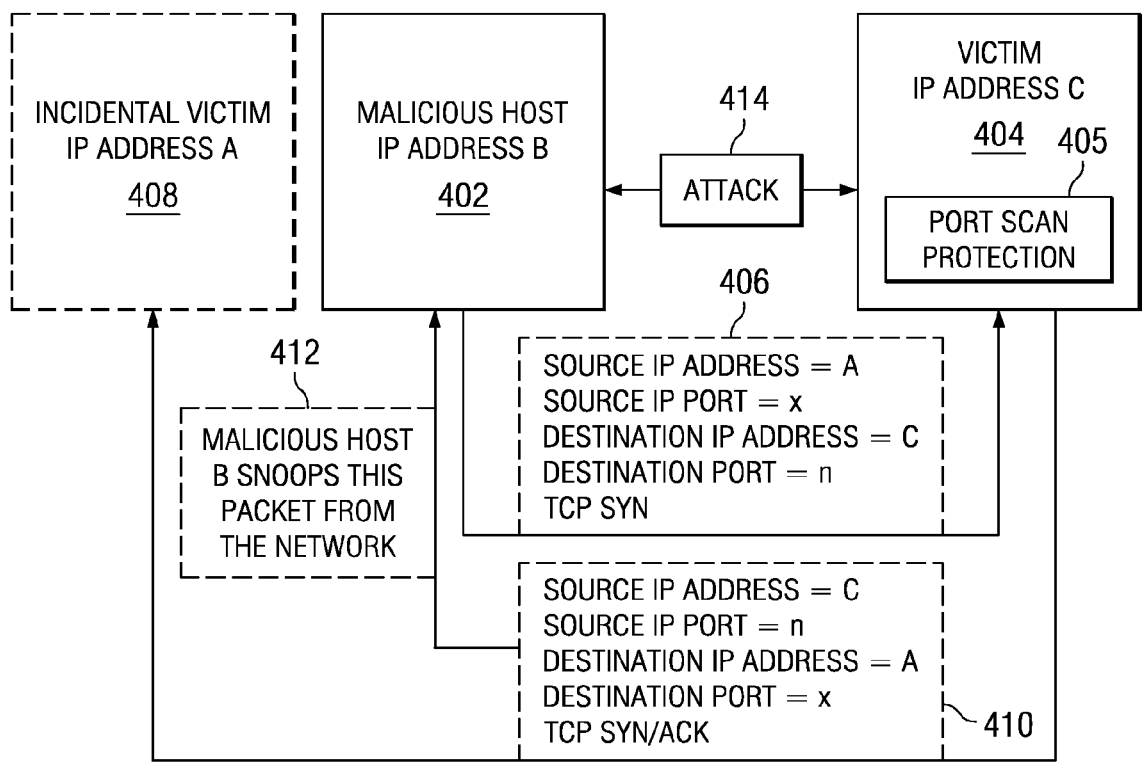
FIG. 3 is a block diagram of an open systems interconnection (OSI) basic reference model in accordance with an illustrative embodiment.
FIG. 4 is a block diagram illustrating a currently used port scan protection mechanism.

Turning now to FIG. 3, a block diagram of an open systems interconnection (OSI) basic reference model is shown in accordance with an illustrative embodiment. Open systems interconnection reference model 300 is a common model of standard protocol layers for defining interoperability and communications between network devices. In this example, open systems interconnection reference model 300 includes the transmission control protocol/Internet protocol (TCP/IP) suite.

TCP/IP and similar protocols are utilized by open systems interconnection communications architecture. In this example, the architecture includes application layer 302, presentation layer 304, session layer 306, transport layer 308, network layer 310, datalink layer 312, and physical layer 314. Each layer is responsible for handling various functions and/or communications tasks.

Application layer 302 handles the details of the particular application being accessed and/or executed. Many common TCP/IP applications are present for almost every implementation, including a Telnet for remote login; a file transfer protocol (FTP); a simple mail transfer protocol (SMTP) for electronic mail; and a simple network management protocol (SNMP).

The application software handled by application layer 302 may include any number of software applications designed to react to data through the communications port to provide the desired functionality the user seeks. Applications at this level may include those necessary to handle data, video, graphics, photos, and/or text which can be accessed by users of the Internet.

Presentation layer 304 includes a presentation protocol and a presentation service. The presentation service is used to identify an agreed upon transfer syntax that will be used. The presentation protocol enables users to communicate with the presentation service.

Session layer 306 consists of a session protocol and a session service. The session service provides services to the user, including, but not limited to, establishing connections between session-service users, terminating connections between users, performing negotiations for use of session layer tokens, and synchronizing points in transmitted data to permit the session to be recovered if an error or interruption occurs. The session protocol allows users to communicate with the session service.

Next, transport layer 308 provides an interface between network layer 310 and application layer 302 that facilitates the transfer of data between two host computers. Transport layer 308 is concerned with things such as, but not limited to, dividing the data passed to it from the application into appropriately sized chunks for the network layer below, acknowledging received packets, and setting timeouts to make certain the other end acknowledges packets that are sent. In the TCP/IP protocol suite, two distinctly different transport protocols are present, transmission control protocol (TCP) and user datagram protocol (UDP).

Transmission control protocol provides reliability services to ensure that data is properly transmitted between two hosts, including dropout detection and retransmission services. Conversely, user datagram protocol provides a much simpler service to application layer 302 by merely sending relatively simple packets of data called datagrams from one host to the other. Datagrams are transmitted without providing any mechanism for guaranteeing that the data in the datagram is properly transferred. When using user datagram protocol, application layer 302 must perform the reliability functionality. An example of transport layer data packet information includes, but is not limited to, a port number for a source host and/or a port number for a destination host.

Network layer 310, which may also be referred to as the Internet layer, handles the movement of packets of data around the network. For example, network layer 310 handles the routing of various packets of data that are transferred over the network. Network layer 310 in the TCP/IP suite is comprised of several protocols, including Internet protocol (IP), Internet control message protocol (ICMP), and Internet group management protocol (IGMP). Internet protocol (IP) may include, but is not limited to, Internet protocol version 4 (IPv4), Internet protocol version 6 (IPv6), or any other known or available version of Internet protocol. An example of network layer data packet information may include, but is not limited to, an Internet protocol (IP) address identifying a source host IP address and/or a destination host IP address.

Datalink layer 312 may also be referred to as the link layer or the network interface layer and normally includes the device driver in the operating system and the corresponding network interface card in the computer. Datalink layer 312 typically handles all the hardware details of physically interfacing with physical layer 314, such as, but not limited to, an Ethernet network Interface card and/or a wireless Internet adapter. An example of datalink layer data packet information may include, but is not limited to, a media access control (MAC) address.

Physical layer 314 refers to the network media being used, such as optical cables or Ethernet cables. In other words, physical layer 314 is the physical network cable connecting a computing device, such as client 110 in FIG. 1, to a network, such as network 102 in FIG. 1.

The mechanism of the illustrative embodiments may be more specifically implemented in a layer, such as transport layer 308 and/or network layer 310.

FIG. 4 is a block diagram illustrating a currently used port scan protection mechanism. Network data processing system 400 is a data processing system including two or more computing devices connected to a network, such as network data processing system 100 in FIG. 1. In this example, the network is the Internet. However, the network may also include a local area network, a wide area network, an Ethernet, or any other type of network. Network data processing system 400 includes malicious host 402 and victim 404.

Malicious host 402 is a hacker or other unauthorized user on a computing device, such as client 110 in FIG. 1, performing a port scan of victim 404. In other words, malicious host 402 is attempting to locate a vulnerable open access point in victim 404 so that malicious host 402 can gain unauthorized access to victim 404 and/or launch an attack on victim 404 through the open port. Malicious host 402 is performing a port scan of victim 404 to locate vulnerable open access points for use in launching an attack against victim 404.

Victim 404 is a computing device hosting one or more applications and/or services. Malicious Host 402 is connected to a network, such as network 102 in FIG. 1. A client computing device can access the applications and/or services available on victim 404 by requesting a connection to a port associated with a given application or service through a network connection.

Victim 404 includes port scan protection 405. Port scan protection 405 is any currently available port scan protection software for detecting port scans and blocking a source IP address of malicious host 402. A common method by which port scan protection 405 works is by monitoring a set of closed ports which are not being used by victim 404, but may be used by hackers for exploitation due to vulnerabilities associated with the applications associated with the ports. Port scan protection 405 assumes that legitimate users would not attempt to access a port in the set of closed ports because legitimate users would know that victim 404 does not provide the applications or services associated with the set of closed ports. Only malicious hosts, such as malicious host 402 would attempt to connect to a port in the set of closed ports because they are fishing for vulnerable services listening on the ports.

If port scan protection 405 detects a data packet requesting a connection to a port in the set of closed ports, such as a synchronization (SYN) data packet or a pattern of these data packets coming from a particular remote host, port scan protection 405 will shun or block all traffic from the particular remote host. In this manner, even if the remote host detected a vulnerable open port, the remote host will not be able to launch an attack because all future network traffic from the remote host is blocked.

In this example, malicious host 402 performs a port scan by sending a series of data packets to victim 404 requesting a connection to one or more well-known ports on victim 404. Data packet 406 is one of the series of data packets sent by malicious host 402.

Data packet 406 is a transmission control protocol/Internet protocol (TCP/IP) data packet containing a request to connect to a port identified as port "n" on victim 404. In this example, data packet 406 is transmission control protocol synchronization (TCP SYN) message requesting connection to port "n." Port "n" may be any port number, such as port 80 associated with hypertext transfer protocol traffic.

In this example, data packet 406 includes a fake or false source IP address. A source IP address is an IP address identifying the sender of a data packet. A fake source IP address is an IP address identifying incidental victim 408 rather than the actual sender of data packet 406. Incidental victim 408 may be an actual computing device or incidental victim 408 may not actually exist. In other words, the fake IP address used by malicious host 402 does not have to identify an actual computing device. In this example, data packet 406 includes source IP address "A" associated with incidental victim 408 rather than IP address "B" which is the actual IP address for malicious host 402.

In response to receiving data packet 406, victim 404 sends data packet 410 to incidental victim 408. Data packet 410 is a transmission control protocol/Internet protocol data packet indicating whether port "x" is an open port or a closed port. In this example, data packet 410 is a synchronize acknowledge (SYN/ACK) message. Data packet 410 is being sent to a destination IP address "A" associated with incidental victim 408. Therefore, malicious host 402 will not receive data packet 410 in the ordinary course of message transmission from victim 404 to incidental victim 408.

Because malicious host 402 is not the intended recipient of data packet 410, malicious host 402 snoops 412 data packet 410 from the network. Snooping refers to capturing or viewing a data packet that was intended to be sent to a different destination computing device. In this example, malicious host 402 uses a packet sniffer to snoop data packet 410 intended to be received by incidental victim 408. A packet sniffer is an application that captures data packets transmitted over the network despite the fact that the malicious host is not the intended recipient of the data packet.

Thus, malicious host 402 is informed as to whether port "x" is an open port that may be vulnerable to attack. If port "x" is an open port, malicious host 402 launches attack 414 against victim 404.

Victim 404 has current port scan protection software. The current port scan protection allows victim 404 to recognize data packet 406 as a possible port scan from a hacker, such as malicious host 402. The current port scan protection software enables victim 404 to block subsequent messages from the source IP address identified in a suspected port scan, such as data packet 406. However, because the source IP address in data packet 406 was a fake IP address, victim 404 will not block messages from malicious host 402, such as messages from malicious host 402 associated with attack 414. In this manner, malicious host 402 may be able to bypass current port scan protection software to attack and possibly disable or compromise victim 404.

Thus, in this example, malicious host 402 is a port scanner that is attempting to connect to a vulnerable port by sending a TCP SYN packet, such as data packet 406, to a given port on victim 404. Data packet 406 generated by malicious host 402 includes a fake source IP address for an incidental victim that may or may not exist. If there is a program or application listening on the given port, victim 404 responds by sending a TCP SYN/ACK packet, such as data packet 410 to the incidental victim.

Malicious host 402 monitors the network and sees data packet 410 go by. Malicious host 402 determines that the given port is an open port that can be connected to for exploitation of any existing vulnerabilities in the application associated with the given port. Malicious host 402 can determine which application is associated with the given port based on the well-known port numbers assigned to each port.

Port scan protection 405 on victim 404 responds to the fake packet by blocking the fake source IP address "A" for incidental victim 408. Malicious host 402 is free to send attack 414 to the given port on victim 404 using the appropriate hacking tool for this particular port and vulnerable application program associated with the particular port.

The illustrative embodiments recognize that when current port scan protection software responds to a fake data packet using a fake source IP address received from a hacker during a port scan, the port scan protection software responds by blocking the fake source IP address for the incidental victim, rather than the actual IP address for the true malicious host. The current port scan protection software fails to identify and block the true source IP address where fake source IP addresses are provided by a malicious host. Therefore, the illustrative embodiments recognize the need for enhanced port scan protection software that will shun a host IP address that is actually launching an attack as quickly as possible after a port scan is detected.

Thus, the illustrative embodiments provide a computer implemented method, apparatus, and computer usable program code for port scan protection. In one embodiment, the process generates a reply data packet having a modified header for a protocol used to transmit data packets to form a modified reply data packet in response to detecting a port scan.

In the illustrative embodiments described below, the modified header for the protocol that is used to transmit data packets is a modified transmission control protocol header. However, the illustrative embodiments are not limited to modifying headers in transmission control protocols. The illustrative embodiments may modify a header in any type of known or available protocol used for transmitting data packets over a network connection to form a modified reply data packet, including, but not limited to, transmission control protocol or user datagram protocol (UDP).

The modified reply data packet will elicit a response from a recipient of the modified data packet. The process sends the reply data packet to a first routing address associated with the port scan. The process identifies a second routing address in a header of the response data packet in response to receiving a response to the modified reply data packet. In the examples described below, the first routing address is a first Internet protocol address and the second routing address is a second Internet protocol address. The Internet protocol may be any version of Internet protocol, including but not limited to, Internet protocol version 4 (Ipv4), Internet protocol version 6 (Ipv6), or any other version of Internet protocol. In addition, the illustrative embodiments are not limited to Internet protocol. Any type of known or available protocol for providing routing addresses for one or more ports may be used in accordance with the illustrative embodiments.

The second routing address is an actual routing address of a source of the port scan. All network traffic from the second routing address may then be blocked to prevent an attack on any open ports.

Figure 5:
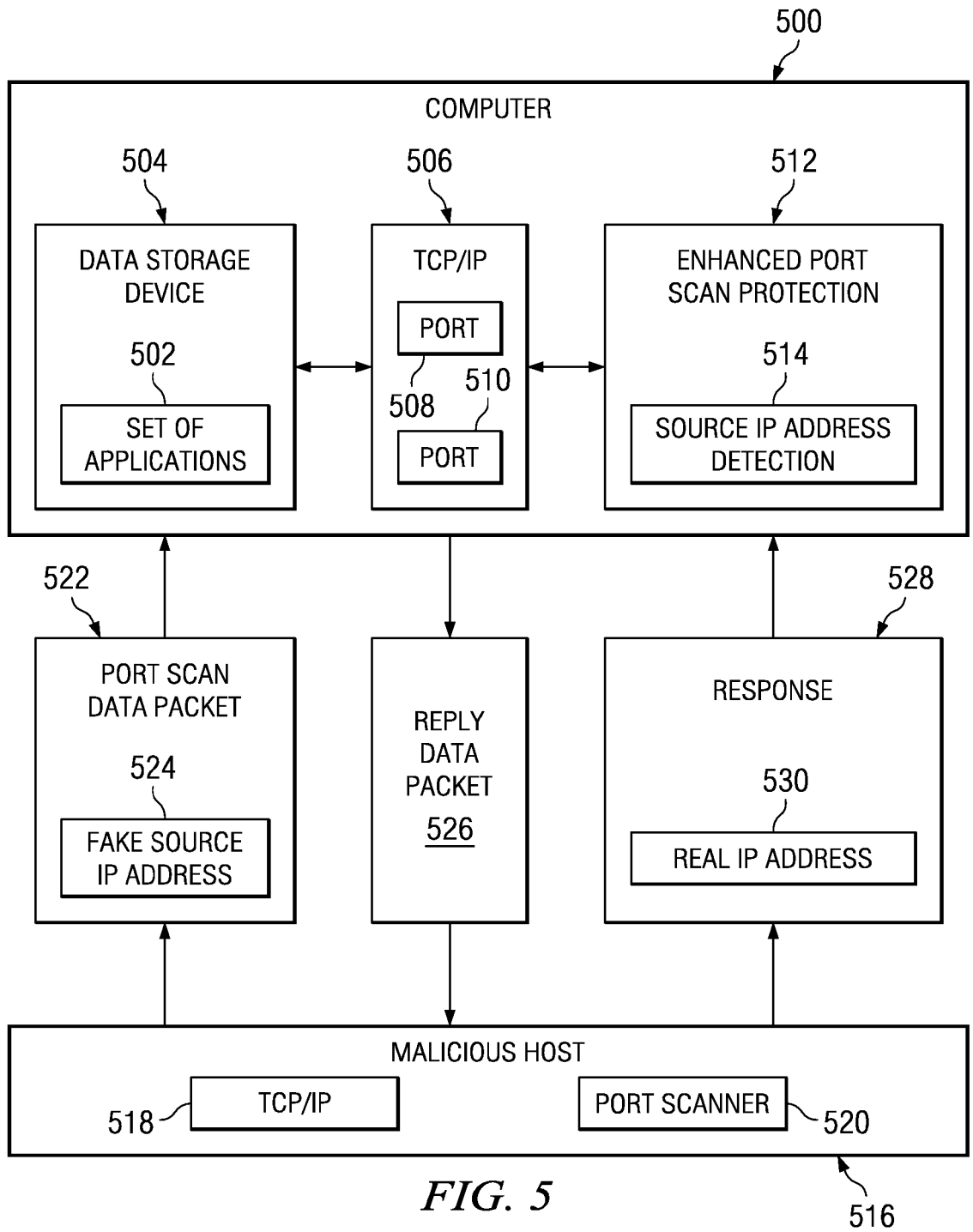
FIG. 5 is a block diagram illustrating a flow through a port scan protection system for detecting a port scan with a fake source IP address in accordance with an illustrative embodiment.

Turning now to FIG. 5, a block diagram illustrating a flow through a port scan protection system for detecting a port scan with a fake source IP address is shown in accordance with an illustrative embodiment. Computer 500 may be implemented using any type of computing device, including but not limited to, server 106 or client 110 in FIG. 1.

Computer 500 includes set of applications 502. Set of applications 502 is a set of one or more applications and/or services available on computer 500. An application is computer software that uses the resources of a computing device to perform a task or service for a user.

Set of applications 502 may be stored on a data storage device, such as data storage device 504. Data storage device 504 is any type of known or available device for storing data, including but not limited to, main memory, a database, a read only memory (ROM), a random access memory (RAM), a non-volatile random access memory (NV-RAM), a hard disk, a flash memory, a floppy disk, a compact disk rewritable (CD-RW), or any other type of data storage device. In this example, data storage device 504 is located on or locally to computer 500. However, data storage device 504 may also be located remotely to computer 500.

Computer 500 uses transmission control protocol/Internet protocol (TCP/IP) 506 to transmit and receive messages from other computing devices connected to a network, such as network 102 in FIG. 1. TCP/IP 506 is a suite of standard protocols for providing a connection between a sender and receiver. TCP/IP 506 may provide guaranteed delivery and ensure that packages are received in a correct sequence. In other words, when messages are sent from another computing device to computer 500, the messages may not be received in order. Therefore, TCP/IP 506 uses transmission control protocol (TCP) sequence numbers to ensure the messages are delivered to the application layer in the correct order.

TCP/IP 506 gives a sequence number to every message that is sent by TCP/IP 506 so that a recipient of the messages can determine the correct order for the messages. Initial sequence numbers (ISNs) are exchanged between computer 500 and a second computing device when the connection between computer 500 and the second computing device is established. TCP/IP 506 allows for receiving messages with sequence numbers that are out of sequence if the out-of-sequence numbers are within certain bounds or limitations. However, if the sequence number is too far outside the expected range of sequence numbers, the message will be disregarded or identified as a bad message. In such cases, computer 500 may request the second computer resend the message with the bad sequence number.

TCP/IP 506 includes port 508 and port 510. In this example, computer 500 is depicted as having two ports. However, computer 500 may have any number of ports.

Port 508 has an assigned port number and is associated with an application in set of applications 502. For example, if port 508 is associated with an application for handling hypertext transfer protocol traffic, then port 508 would be assigned to port number 80. In this example, port 508 is an open port.

Port 510 is also assigned a port number. In this example, port 510 is assigned port number 20 for file transfer protocol (FTP). However, in this example, file transfer protocol is not available on computer 500. Therefore, port 510 is a closed port.

Computer 500 also includes enhanced port scan protection 512. Enhanced port scan protection 512 is port scan protection software for detecting port scans and blocking an IP address associated with a malicious host or other computing device performing the port scan, such as malicious host 516.

Malicious host 516 is a hacker, cracker, unauthorized user, or illegitimate user performing a port scan on one or more ports associated with computer 500, such as ports 508 and 510. Malicious host 516 includes TCP/IP 518 suite of protocols for sending and receiving data packets over the network. Malicious host 516 connects to computer 500 over this network connection.

Malicious host 516 includes port scanner 520. Port scanner 520 may be any type of known or available device for performing a port scan of a set of one or more ports on computer 500. Port scanner 520 may be implemented completely in software or as a combination of hardware and software. In this example, port scanner 520 generates port scan data packet 522. Port scan data packet 522 includes fake source IP address 524. Fake source IP address 524 is not an IP address associated with malicious host 516. Fake source IP address 524 may be an IP address for an actual computing device other than malicious host 516, or fake source IP address 524 may be an IP address for a computing device that does not actually exist.

Enhanced port scan protection 512 includes source IP address detection 514. Source IP address detection 514 is a software component for generating reply data packet 526. Reply data packet 526 is a data packet that is modified to compel TCP/IP 518 on malicious host 516 to generate response 528. In other words, if enhanced port scan detection 512 detects a port scan, enhanced port scan protection 512 responds by sending reply data packet 526 to malicious host 516 that will cause malicious host 516 to send response 528. Response 528 may include a reset (RST) flag or finish acknowledge (FIN/ACK) flag in the transmission control protocol header of response 528. In this example, response 528 also includes the malicious host's real IP address 530 in the network layer of the transmission control protocol header of response 528.

Computer 500 can identify the malicious host's real IP address 530 from response 528. Enhanced port scan protection 512 then shuns or blocks real IP address 530 of malicious host 516 to prevent any future attacks from malicious host 516.

Figure 6:
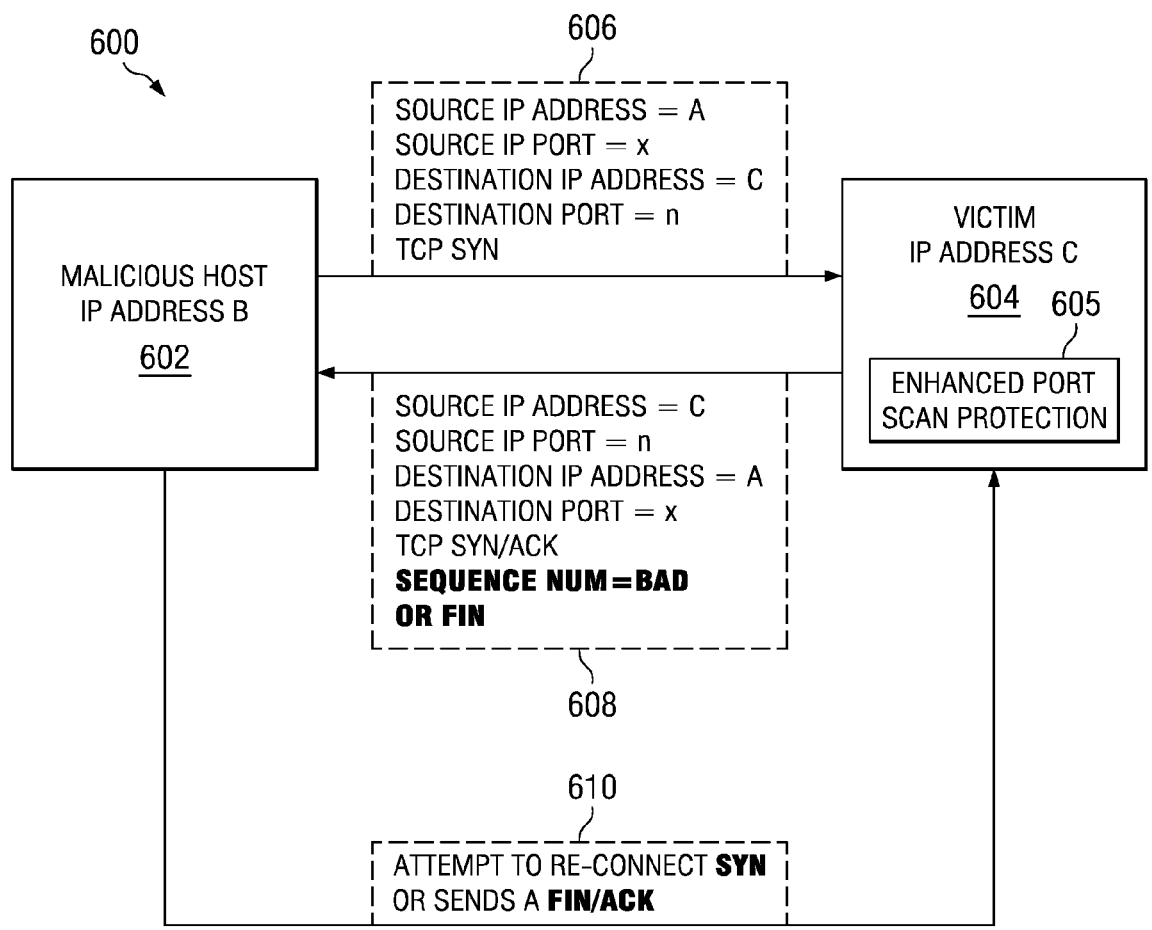
FIG. 6 is a block diagram illustrating a port scan protection mechanism in accordance with an illustrative embodiment.

Next, FIG. 6 is a block diagram illustrating a port scan protection mechanism in accordance with an illustrative embodiment. Network data processing system 600 is a data processing system including multiple computing devices connected over a network, such as network data processing system 100 in FIG. 1. In this example, the network is the Internet. However, the network may also include a local area network, a wide area network, an Ethernet, or any other type of network. Network data processing system 600 includes malicious host 602 and victim 604.

Malicious host 602 is a hacker or other unauthorized user on a computing device, such as client 110 in FIG. 1, or malicious host 516 in FIG. 5. Malicious host 602 is performing an unauthorized port scan on victim 604 in an attempt to locate a vulnerable open access point so that malicious host 602 can gain unauthorized access to victim 604 and/or launch an attack on victim 604 through the open port.

Victim 604 is a computing device hosting one or more applications and/or services, such as server 106 in FIG. 1 or computer 500 in FIG. 5. A client computing device can access the applications and/or services available on victim 604 by requesting a connection to a port associated with a given application or service through a network connection.

Victim 604 includes enhanced port scan protection 605 that includes source IP address detection software, such as enhanced port scan protection 512 in FIG. 5. Enhanced port scan protection 605 is software for use in identifying an IP address of malicious host 602 when malicious host 602 launches a port scan by sending data packet 606 using a fake source IP address and blocking the IP address for malicious host 602 rather than blocking the fake source IP address used by malicious host 602.

Malicious host 602 performs a port scan by sending a series of data packets to victim 604 requesting a connection to one or more well-known ports on victim 604. Data packet 606 is one of the series of data packets sent by malicious host 602 to a port on victim 604, such as port scan data packet 522 in FIG. 5.

Data packet 606 is a transmission control protocol/Internet protocol data packet requesting a connection to a port identified as port "n" on victim 604. In this example, data packet 606 is a transmission control protocol synchronization (TCP SYN) data packet. Port "n" may be any port number, such as port 80 associated with hypertext transfer protocol traffic.

Data packet 606 includes a fake or false source IP address for an incidental victim. The incidental victim may or may not actually exist. In this example, data packet 606 includes source IP address "A" associated with an incidental victim, rather than IP address "B" which is the actual IP address for malicious host 602.

In response to receiving data packet 606, enhanced port scan protection 605 generates data packet 608. Data packet 608 is a reply data packet, such as reply data packet 526 in FIG. 5. Data packet 608 is manufactured so that the data packet will elicit a response from malicious host 602 if malicious host 602 snoops data packet 608 from off the network. The header of the transmission control protocol (TCP) header of data packet 608 is altered in a manner that will trick the TCP/IP layer of the malicious host into responding to data packet 608 if malicious host 602 snoops data packet 608 from the network.

For example, if enhanced port scan protection 605 gives data packet 608 a bad sequence number, TCP/IP layer of malicious host 602 will respond by sending a synchronization (SYN) flag in an attempt to reconnect to victim 604. A bad sequence number is a sequence number that is outside the expected or acceptable range of possible sequence numbers.

A finish (FIN) flag indicates the end of a session. When a data packet, including a finish flag, is received, TCP/IP automatically sends a finish acknowledgement in response. Thus, if port scan protection 605 gives data packet 608 a finish flag, TCP/IP layer of malicious host 602 will automatically send a finish acknowledge (FIN/ACK) flag in a response message to victim 604.

Thus, in this example, enhanced port scan protection 605 sends data packet 608 to the incidental victim associated with the fake source IP address. Data packet 608 is a transmission control protocol/Internet protocol data packet indicating whether port "n" is an open port or a closed port. In this example, data packet 608 contains a synchronize acknowledge (SYN/ACK) flag and a bad sequence number. Victim 604 sends data packet 608 to the fake IP address "A" associated with the incidental victim. The datalink layer in the header of data packet 608 indicates a media access control (MAC) address for the destination of data packet 608. The media access control address specifies the particular network adapter of the destination computing device. In this case, the media access control address specifies the network adapter of the incidental victim.

Normally, if malicious host 602 was not running in snoop mode, malicious host 602 would not receive data packet 608 because the datalink layer media access control address does not match the network adapter associated with malicious host 602. However, in this example, malicious host 602 is in snoop mode. Therefore, the Ethernet driver associated with malicious host 602 will ignore the media access control address in the header of data packet 608 and pass data packet 608 up the TCP/IP layer associated with malicious host 602.

Malicious host 602 snoops data packet 608 from the network. In this example, malicious host 602 uses a packet sniffer to snoop data packet 608 from the network. In response to detecting the bad sequence number in data packet 608, the TCP/IP layer of malicious host 602 automatically generates and transmits a response to data packet 610 to victim 604 in an attempt to reconnect to victim 604. Data packet 610 is a response data packet, such as response 528 in FIG. 5.

Data packet 610 contains the actual source IP address "B" for malicious host 602 rather than the fake IP address "A." Enhanced port scan protection 605 blocks the actual source IP address "B" from sending further messages to victim 604 over the network. In this manner, malicious host 602 is blocked from launching any attacks on any vulnerable ports on victim 604.

FIG. 7 is an exemplary illustration of port scan packets transmitted during a port scan in accordance with an illustrative embodiment. Port scan data packet 702 is a data packet having a false source IP address generated by a malicious host, such as port scan data packet 522 in FIG. 5 and/or data packet 606 in FIG. 6. In this example, the port scan data packet is a synchronization (SYN) data packet.

Reply data packet 703 is a data packet generated by a recipient of port scan data packet 702, such as reply data packet 526 in FIG. 5 and/or data packet 608 in FIG. 6. The recipient is an intended victim of the malicious host. Reply data packet 703 is generated by the victim and sent to the false IP address. In this example, the reply data packet is a synchronization acknowledge (SYN/ACK) data packet generated by an intended victim of the malicious host, such as victim 604 in FIG. 6.

Port scan data packet 702 includes information for the datalink layer in section 704. The transmission route of the port scan data packet from the malicious host to the intended victim will assign the Ethernet (ETH) media access control (MAC) address based on routing tables.

Port scan data packet 702 also includes information in the network layer. The network layer information includes a fake source IP address "A" in line 705. The fake source IP address "A" is an IP address for an existent or non-existent incidental victim, rather than the actual IP address for the malicious host that generated port scan data packet 702. The network layer information in the data packet also includes a destination IP address 706 identifying the victim computing device.

The transport layer information in port scan data packet 702 identifies a source port number for the malicious hacker and a destination port number for the victim host computing device, as shown in line 708. Line 710 is a sequence number for the port scan packet. Line 712 identifies the data packet as a synchronization (SYN) data packet requesting a connection with the victim computing device.

Reply data packet 703 includes a source IP address for victim 714 and destination IP address 716. Destination IP address 716 is the fake IP address used by the malicious hacker.

The transport layer information includes a source port number for the victim computing device generating the reply data packet, as shown in line 714. Line 716 includes a destination IP address. The destination IP address in this example is the fake IP address for the incidental victim. The incidental victim may or may not actually exist.

Line 722 may provide a bad sequence number. The bad sequence number is a sequence number that is outside the expected or acceptable range of possible sequence numbers.

Line 722 indicates that reply data packet 703 is a synchronization/acknowledge (SYN/ACK) data packet. In another example, line 722 could indicate that reply data packet 703 is a reset (RST) or finish (FIN) data packet.

In other words, using currently available port scan protection software, if the victim had an active service on port 23, which may be identified in line 708, the victim would respond by generating a SYN/ACK reply data packet. This would be the end of the session between port 23 on the victim and port 1494 of the malicious host. The malicious host would then know that the victim had a telnet service running on port 23. The malicious host could then launch a telnet attack on port 23. The current port scan protection software would block the fake IP address identified in line 705 of the port scan packet but would be unable to block the actual IP address of the malicious host. Thus, the malicious host would be free to attack port 23.

In accordance with the illustrative embodiments, when the victim receives port scan data packet 702, the enhanced port scan protection software on the victim responds in such a way as to obligate the actual malicious host to respond. For example, the enhanced port scan protection software generates reply data packet 703 that includes a bad sequence number, a reset (RST) message, or a finish (FIN) message. Because the incidental host never sent port scan data packet 702, the incidental host will not respond to reply data packet 703. Instead, if the incidental host actually exists, the incidental host will only ignore reply data packet 703. If the incidental host does not exist, then the incidental host cannot respond to reply data packet 703. Thus, only the malicious host is expected to respond to reply data packet 703. In this manner, the victim can identify and block the actual IP address of a malicious host using a port scan to identify open ports that may be vulnerable to attack by the malicious host.

Referring now to FIG. 8, a flowchart illustrating a process for detecting a port scan with a fake source IP address is depicted in accordance with an illustrative embodiment. In this illustrative example shown in FIG. 8, the process is performed by a software component for port scan protection, such as enhanced port scan protection 512 in FIG. 5.

The process begins by making a determination as to whether a port scan is detected (step 802). If a port scan is not detected, the process returns to step 802 until a port scan is detected. A port scan may be detected when a port scan data packet or a series of data packets is received from a malicious host.

If a port scan is detected in step 802, the process generates a modified reply data packet (step 804). The process sends the modified reply data packet to the source IP address identified in the port scan data packet (step 806). In this example, the source IP address is a fake source IP address that is not a correct IP address of the host conducting the port scan.

The process then makes a determination as to whether a response to the reply is received (step 808). If a response is not received, the process returns to step 808 until a response is received. When a response is received in step 808, the process blocks all network traffic from a second IP address identified in the transmission control protocol header of the response (step 810) to prevent any attacks that may be launched from the source of the port scan with the process terminating thereafter.

FIG. 9 is a flowchart illustrating a process for modifying a reply data packet in accordance with an illustrative embodiment. In this example in FIG. 9, the process may be implemented by a software component for port scan protection, such as enhanced port scan protection 512 in FIG. 5.

The process begins by generating a reply data packet (step 902). The process makes a determination as to whether to modify the reply data packet by adding a bad sequence number to the transmission control protocol header for the reply data packet (step 904). If a determination is made to modify the reply data packet by adding a bad sequence number, the process adds a bad sequence number to the header of the reply data packet (step 906) and transmits the modified reply data packet to the incidental victim (step 908) with the process terminating thereafter.

Returning to step 904, if a determination is made that a bad number sequence will not be added, the process makes a determination as to whether to add a reset flag or a finish flag to the reply data packet (step 910). If the process makes a determination that a flag will not be added, the process terminates thereafter.

Returning to step 910, if the process makes a determination to modify the reply data packet by adding a reset flag or a finish flag, the process adds a reset flag or a finish flag (step 912) to the reply data packet. The process then sends the modified reply data packet to the incidental victim (step 908) with the process terminating thereafter.

Thus, the illustrative embodiments provide a computer implemented method, apparatus, and computer usable program code for port scan protection. In one embodiment, the process generates a reply data packet having a modified transmission control protocol header to form a modified reply data packet in response to detecting a port scan. The modified reply data packet will elicit a response from a recipient of the modified data packet. The process sends the reply data packet to a first Internet protocol address associated with the port scan.

The process identifies a second Internet protocol address in a header of the response data packet in response to receiving a response to the modified reply data packet. The second Internet protocol address is an actual Internet protocol address of a source of the port scan. All network traffic from the second Internet protocol address may then be blocked to prevent an attack on any open ports.

The modified transmission control protocol header may include a bad sequence number. A bad sequence number is a sequence number falling outside an acceptable range of sequence numbers. In another embodiment, the modified transmission control protocol header may include a reset flag or a finish flag. In another embodiment, the modified transmission control protocol is generated by altering a checksum used to generate the modified reply data packet.

In this manner, attacks on open and potentially vulnerable ports by hackers using false IP addresses can be prevented.

The flowchart and block diagrams in the figures illustrate the architecture, functionality, and operation of possible implementations of systems, methods and computer program products according to various embodiments. In this regard, each step in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for port scan protection, the computer implemented method comprising:
responsive to detecting a port scan, generating, by a processor, a reply data packet having a modified header conforming to a protocol used to transmit data packets to form a modified reply data packet, wherein the modified reply data packet will elicit a response from a recipient of the modified reply data packet, wherein the modified header will compel the recipient's transmission control protocol/internet protocol layer to respond to the modified reply data packet in response to the recipient snooping the modified reply data packet;

sending the modified reply data packet to a first source internet protocol address associated with the port scan; and responsive to receiving the response to the modified reply data packet, identifying that a second source internet protocol address in a header of the response is a correct source internet protocol address of a source of the port scan, wherein the second source internet protocol address is different from the first source internet protocol address.

2. The computer implemented method of claim 1 wherein the modified header conforming to the protocol includes a bad sequence number.

3. The computer implemented method of claim 2 wherein the bad sequence number is a protocol violation that will excite a response from the recipient.

4. The computer implemented method of claim 2 wherein the bad sequence number is a sequence number falling outside an acceptable range of sequence numbers.

5. The computer implemented method of claim 1 wherein the modified header conforming to the protocol includes a reset flag.

6. The computer implemented method of claim 1 wherein the modified header conforming to the protocol includes a finish flag.

7. The computer implemented method of claim 1 wherein modifying the header further comprises:

altering a checksum used to generate the modified reply data packet.

8. The computer implemented method of claim 1 further comprising:

blocking all network traffic originating from the second routing address to prevent an attack on any open ports.

9. The computer implemented method of claim 1 wherein the first routing address is not a correct routing address of a computing device.

10. The computer implemented method of claim 1 further comprising:

responsive to receiving a port scan data packet, identifying a source routing address in a header of the port scan data packet as the first routing address.

11. The computer implemented method of claim 1 wherein the modified header conforming to the protocol is a modified transmission control protocol header.

12. The computer implemented method of claim 1 wherein the modified header conforming to the protocol is a modified user datagram protocol header.

13. The computer implemented method of claim 1 wherein a datalink layer in the modified header indicates a media access control address for a destination of the modified reply data packet.

14. A computer program product for port scan protection, the computer program product comprising:

a computer usable storage device including computer usable program code embodied therewith, the computer usable program code comprising:

computer usable program code for generating a reply data packet having a modified header conforming to a protocol used to transmit data packets to form a modified reply data packet in response to detecting a port scan, wherein the modified reply data packet will elicit a response data packet from a recipient of the modified reply data packet, wherein the modified header will compel the recipient's transmission control protocol/internet protocol layer to respond to the modified reply data packet in response to the recipient snooping the modified reply data packet;

computer usable program code for sending the modified reply data packet to a first source internet protocol address associated with the port scan; and computer usable program code for identifying that a second source internet protocol address in a header of the response data packet in response to receiving the response data packet a correct source internet protocol address of a source of the port scan, wherein the second source internet protocol address is different from the first source internet protocol address.

15. The computer program product of claim 14 wherein the modified header conforming to the protocol includes a bad sequence number.

16. The computer program product of claim 15 wherein the bad sequence number is a sequence number falling outside an acceptable range of sequence numbers.

17. The computer implemented method of claim 15 wherein the bad sequence number is a protocol violation that will excite a response from a recipient of the reply data packet.

18. The computer program product of claim 14 wherein the modified header conforming to the protocol includes a reset flag.

19. The computer program product of claim 14 wherein the modified header conforming to the protocol includes a finish flag.

20. The computer program product of claim 14 further comprising: computer usable program code for altering a checksum used to generate the modified reply data packet.

21. The computer program product of claim 14 further comprising:

computer usable program code for blocking all network traffic originating from the second routing address to prevent an attack on any open ports.

22. The computer program product of claim 14 wherein the modified header conforming to the protocol is a modified transmission control protocol header.

23. The computer program product of claim 14 wherein a datalink layer in the modified header indicates a media access control address for a destination of the modified reply data packet.

24. An apparatus comprising:

a bus system;

a communications system connected to the bus system;

a memory connected to the bus system, wherein the memory includes computer usable program code; and a processing unit connected to the bus system, wherein the processing unit executes the computer usable program code to generate a reply data packet having a modified header conforming to a protocol used to transmit data packets to form a modified reply data packet in response to detecting a port scan, wherein the modified reply data packet will elicit a response data packet from a recipient of the modified reply data packet, wherein the modified header will compel the recipient's transmission control protocol/internet protocol layer to respond to the modified reply data packet in response to the recipient snooping the modified reply data packet; send the modified reply data packet to a first source internet protocol address associated with the port scan; and identify that a second source internet protocol address in a header of the response data packet in response to receiving the response data packet a correct source internet protocol address of a source of the port scan, wherein the second source internet protocol address is different from the first source internet protocol address.

25. The apparatus of claim 24 wherein the modified header conforming to the protocol includes a bad sequence number.

26. The apparatus of claim 25 wherein the bad sequence number is a protocol violation that will excite a response from a recipient of the reply data packet.

27. The apparatus of claim 24 wherein the modified header conforming to the protocol includes a reset flag.

28. The apparatus of claim 24 wherein the modified header conforming to the protocol includes a finish flag.

29. The apparatus of claim 24 wherein the processor unit further executes the computer usable program code to block all network traffic originating from the second routing address to prevent an attack on any open ports.

30. The apparatus of claim 24 wherein the modified header conforming to the protocol is a modified transmission control protocol header.

31. The apparatus of claim 24 wherein a datalink layer in the modified header indicates a media access control address for a destination of the modified reply data packet.

32. A system for protecting against port scans, the system comprising:
 a host computer, wherein the host computer comprises:
 an enhanced port scan protection software for detecting a port scan data packet and generating a reply data packet having a modified header conforming to a protocol used to transmit data packets to form a modified reply data packet in response to detecting a port scan, wherein the modified reply data packet will elicit a response data packet from a recipient of the modified reply data packet, wherein the modified header will compel the recipient's transmission control protocol/internet protocol layer to respond to the modified reply data packet in response to the recipient snooping the modified reply data packet, wherein the modified reply data packet is sent to a first source internet protocol address associated with the port scan; and
 a source Internet protocol address detector, wherein the source Internet protocol address detector identifies that a second source internet protocol address in a header of a response to the modified reply data packet is a correct source internet protocol address of a source of the port scan, wherein the second source internet protocol address is different from the first source internet protocol address.

33. The system of claim 32 wherein the modified header conforming to the protocol includes a protocol violation that will excite the response from the recipient of the reply data packet.

34. The system of claim 32 wherein the modified header conforming to the protocol includes a reset flag or a finish flag.

35. The system of claim 32 wherein the host computer is a first computer and further comprising:
 a second computer, wherein the second computer comprises:
 a port scanner, wherein the port scanner performs the port scan on the first computer by sending the port scan data packet having a fake source routing address to the first computer, wherein the fake source routing address is not a correct routing address for the second computer; and
 a transmission control protocol/Internet protocol layer, wherein the transmission control protocol/Internet protocol layer generates the response to the modified reply data packet automatically.

* * * * *